Figure 1:
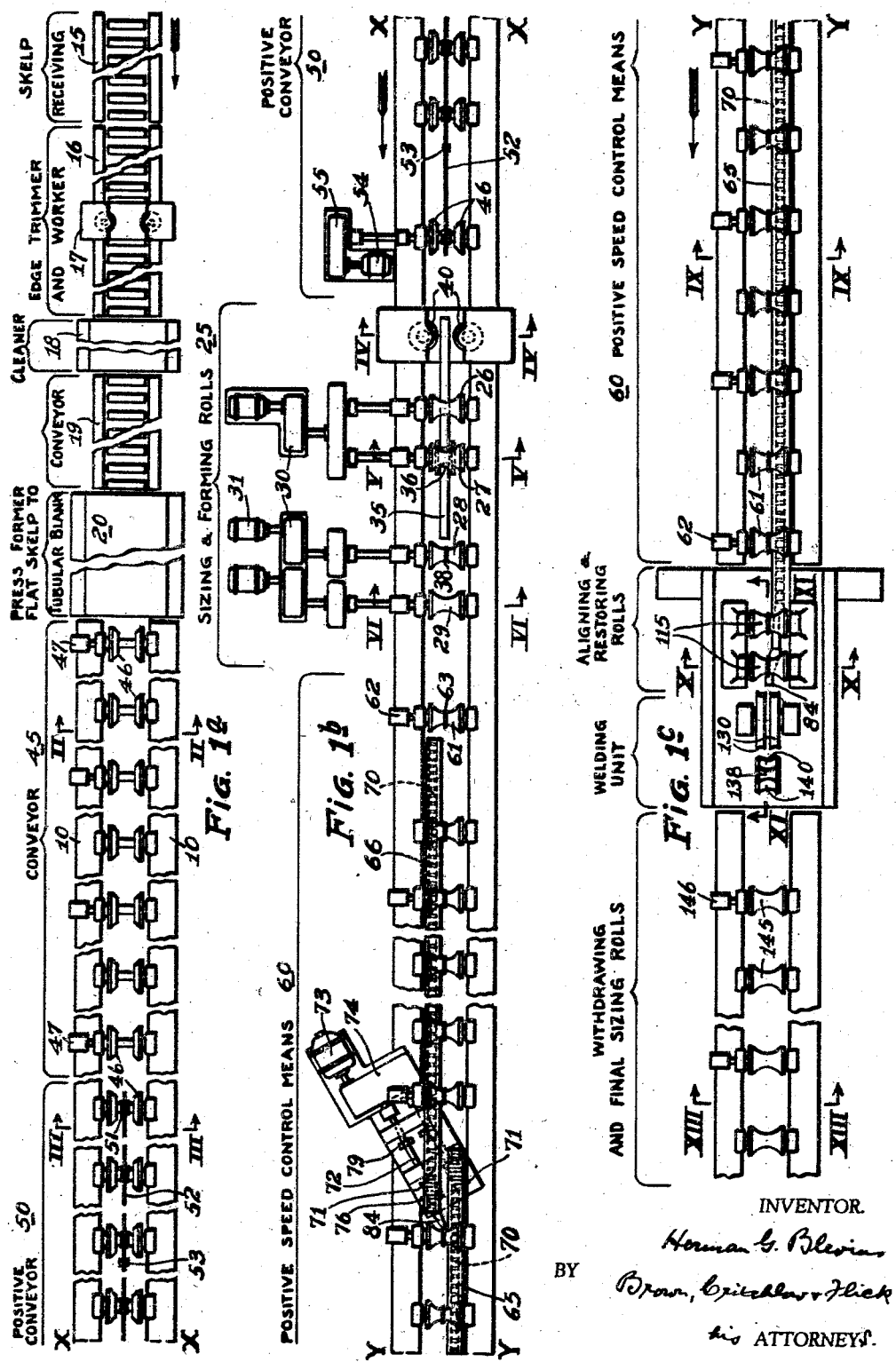

June 22, 1937.  H. G. BLEVINS  2,084,889
APPARATUS FOR WELDING
Filed March 25, 1935   5 Sheets-Sheet 2

WITNESSES

INVENTOR.
Herman G. Blevins
BY
his ATTORNEYS.

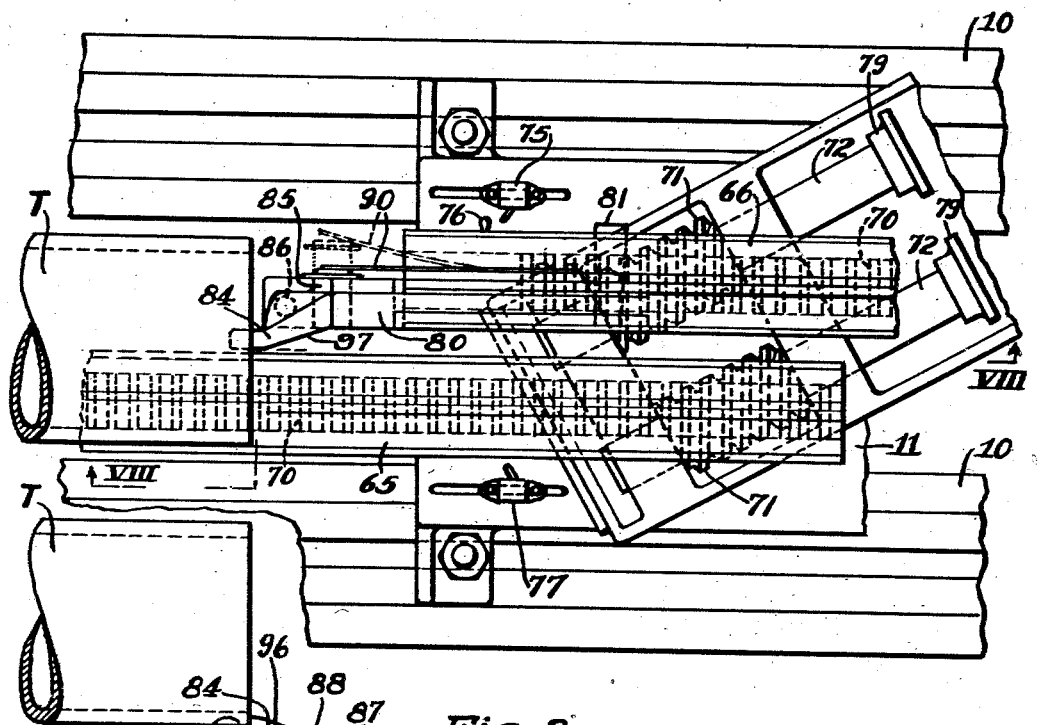

June 22, 1937.  H. G. BLEVINS  2,084,889
APPARATUS FOR WELDING
Filed March 25, 1935    5 Sheets-Sheet 4
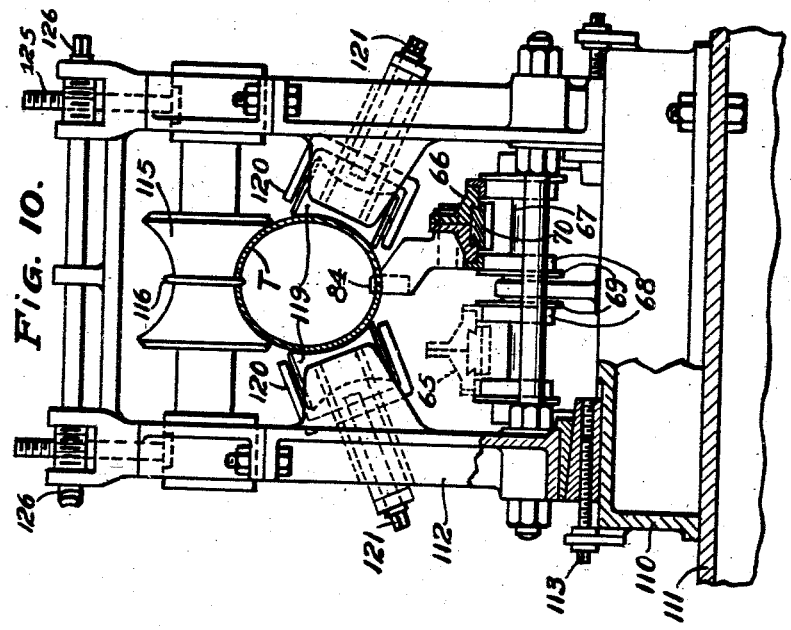
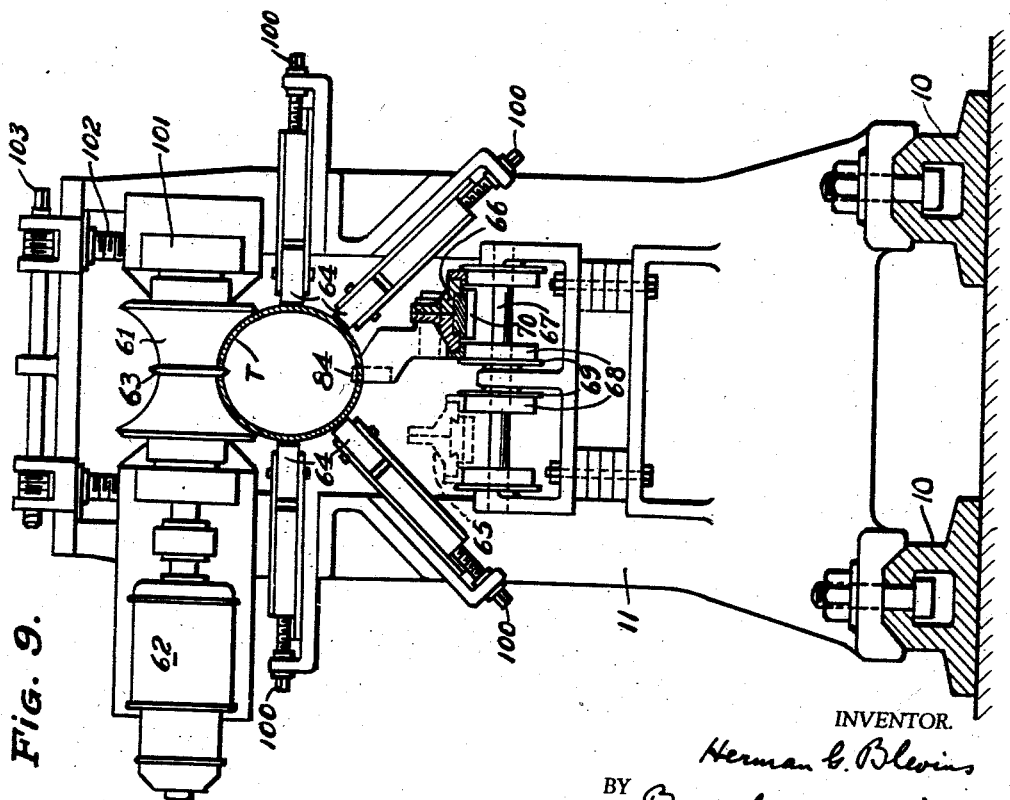
INVENTOR.
Herman G. Blevins
BY Brown, Critchlow & Flick
his ATTORNEYS.

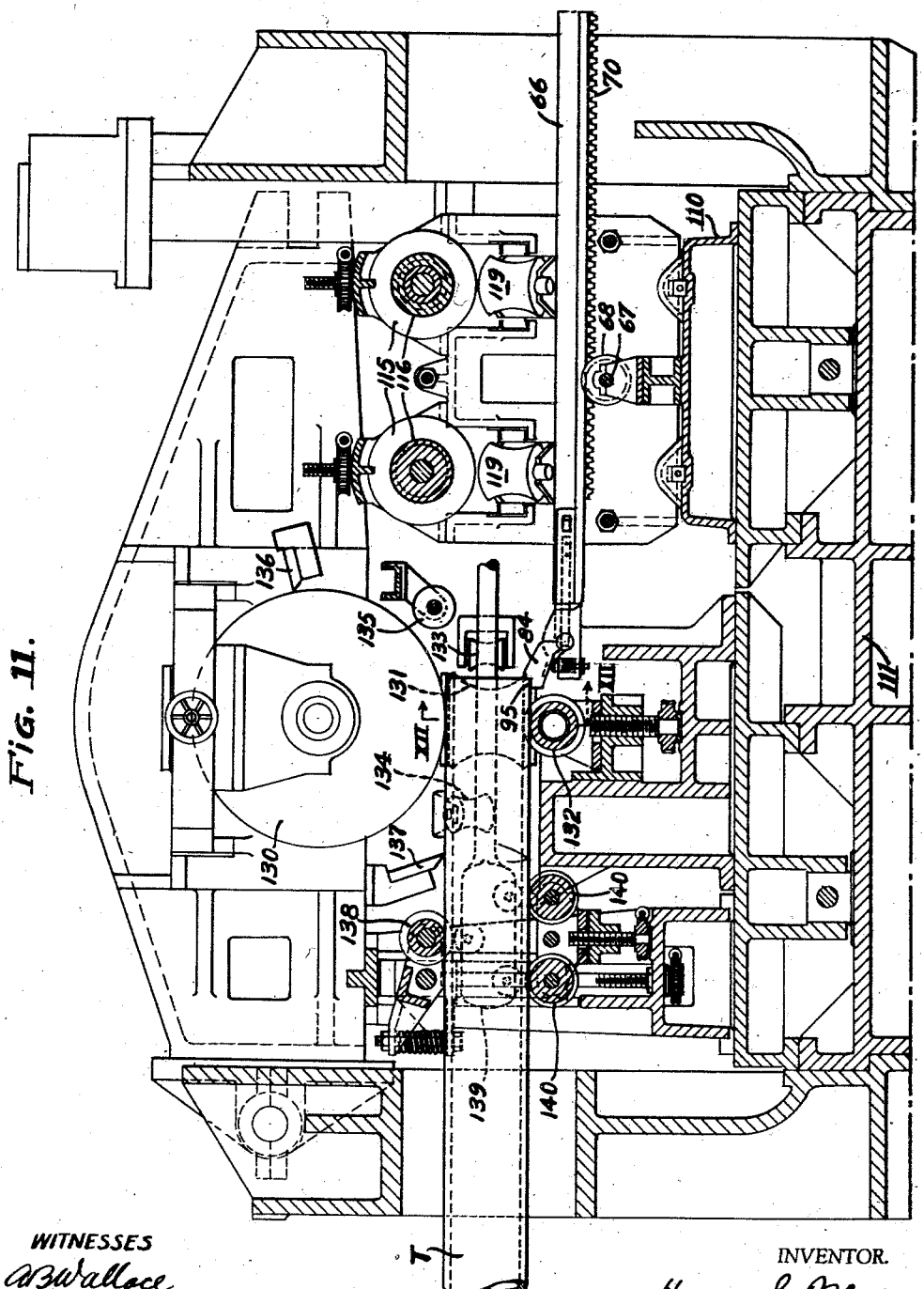

Patented June 22, 1937

2,084,889

UNITED STATES PATENT OFFICE 2,084,889

APPARATUS FOR WELDING

Herman G. Blevins, Sewickley, Pa., assignor to Spang, Chalfant & Company, Inc., Pittsburgh, Pa., a corporation of Pennsylvania Application March 25, 1935, Serial No. 12,785

12 Claims. (Cl. 219—6)

This invention relates to welding, and more particularly to apparatus and methods for electric resistance welding joints or seams in metal members, such as tubular pipe blanks.

In manufacturing tubing and pipe by electric resistance welding means and methods it is of utmost importance to obtain high uniformity and strength in the weld of the longitudinal seam so that weak spots in the weld and inferior pipe are avoided. At the same time the apparatus and methods employed should be adaptable to commercial manufacture and should produce the specified weld in a rapid, economical manner with a minimum of scrap and labor.

Prior to my invention, seam welded tubing, pipe and well casing have been made by various methods and apparatus none of which have proven entirely satisfactory to meet the various requirements. The character of the weld has not been uniform throughout the length of the pipe and imperfect welds and burnt spots have been common resulting in low percentage yields. This has particularly been true in casing formed of high tensile steel, and having relatively heavy walls and comparatively large diameters as distinguished from tubing of relatively thin walls and smaller diameter and from pipe of larger sizes and wall thickness but made of lower tensile strength. Inasmuch as casing is adapted to be subjected to relatively great internal and external pressures its welds should be very uniform and strong. Consistent high percentage yields of reliable welds on casing and even on pipe have not been obtained by known means and methods.

For tubing and other thin walled sections a surface weld has ordinarily been produced in which the faces of the seam to be united are brought to welding temperature and forced together without displacement of metal except at the surfaces of the abutting faces of the seam. This type of weld is satisfactory for thin walled members and for conduits not subjected to high pressure. However, where the welded member is subjected to relatively high internal or external, particularly gas or fluid, pressures, as is the case ordinarily in heavy walled pipe, it is necessary to make a body weld of the seam in the blank. As will be evident from the term, a body weld is one in which the metal in the body of the blank adjacent the seam, as well as the surface of the metal at the seam, is raised to welding temperature with the seam edges being united under pressure sufficient to displace the body of metal adjacent the seam.

It will be recognized that three factors are important in determining and obtaining a uniform weld throughout the length of a welded seam, namely, the welding temperature to which the metal is raised, the pressure with which the metal is forced or held in welding relation, and the time that the temperature and the pressure are applied at the weld.

As to temperature, the first of these factors, this is dependent upon the voltage of the welding current, the resistance at the weld to the flow of electric current and the resulting current amperage flowing through the path of resistance at the weld. Uneven surfaces, warping or buckling, adjacent the seam of the blank to be welded cause improper or faulty contact between the blank and the electrodes with changing resistance and current flow. In former practices with which I am familiar this changing contact and the change in the current flow and the welding temperature have been the cause of non-uniform welds and burnt spots on and near the longitudinal pipe seams.

Varying external dimensions on the pipe to be welded, as may be caused in part by changing wall thickness, light throat pressures, or pressures contacting only part of the pipe at the welding throat, slightly eccentric rolls, etc. cause variations in the pressure forcing the faces to be welded together. These changes in pressure result in changes of resistance and current flow inasmuch as the welding current flows from one face to the other during welding.

Accordingly it will be evident that factor two, the pressure with which the metal is forced or held in welding relation, changes the welding resistance at the butting surfaces of the seam and between the electrodes and the blank as well as materially affecting the nature of the weld produced. I have found this noticeably true on heavy walled pipe with which my invention particularly deals.

The third factor, namely, the time that the welding temperature and pressure is applied, is extremely important as small changes in the time are very apt to cause over or underwelding, burning, pipe deformation, etc. The time of weld, in commercial practice, is directly dependent upon the speed with which the blank is passed through the welding throat. Prior to my invention it has been the commercial practice, in electric resistance welding with full support for the blank at the welding throat, to move the blank or tubular skelp through the welding throat by frictional engagement with the outside of the blank by power-driven rolls.

I have discovered that slippage occurs in a drive of this character due to: changes in dimensions or hardness of the blank lengthwise thereof; foreign substance adhering to the blank surface such as scale, grease, etc.; varying resistance encountered by the blank in passing through the welding throat and through sizing rolls such as have always been directly associated with the welding unit; and backlash of driving means. The result has been non-uniform welds.

It is obvious that these variables may counteract or multiply their several effects upon a continuously welded seam, thus making it difficult to produce a uniform product. This is particularly true where the material is fed through the welding throat in the form of a succession of individual blanks instead of a continuous strip, and these in turn engage with their front ends a succession of sets of rolls and the welding throat or electrodes, and in turn become disengaged therefrom. Such repeated engagements and disengagements inevitably result in marked variations in the speed of travel and a non-uniform weld.

It will be appreciated that the several factors determining the weld must be correlated with each other and with the size and character of the seam to be welded. For heavy body welds more current is necessary to obtain welding heat than is necessary for lighter weight surface welds and likewise the current flow is dependent on the speed of the blank through the welding throat as, for example, maintaining a higher rate of speed on the blank will necessitate a heavier welding current flow to obtain the same welding temperature and effect. Once the proper conditions have been worked out for any given weld it then becomes of paramount importance to maintain those conditions and the various factors uniform under commercial operating conditions.

Summarizing the difficulties of prior progressive electric resistance welding methods and apparatus, I believe the chief trouble has been due to failure to exactly control the time of the weld while establishing the best conditions for uniformity of welding pressure and current flow. Particularly is the art barren of means and methods for achieving the desired end with the means and methods being adapted for commercial manufacturing requirements as to speed, continuousness of operation, and relatively low original, upkeep and labor costs.

The object of my invention is to avoid and overcome the difficulties and objections of prior known practices by the provision of improved commercially-feasible methods and apparatus for progressively welding tubular pipe blanks or the like, in which the factors of welding temperature, pressure and time and the various items affecting the same are carefully controlled and established to produce a superior, uniform progressive weld.

My invention is predicated on my discovery that its stated object can be attained by exactly controlling the speed of the blank through a welding throat in which a relatively heavy diameter reducing pressure is applied over the full circumference of the blank at the throat so that the current density and pressure applied to each portion of the progressive weld, as well as the time of application, will be substantially uniform throughout the length of the weld and result in a strong uniform weld.

In the practice of my invention as related to the formation of heavy-walled, large diameter pipe, the flat skelp is first cut to size or trimmed, and its edges which are to form the seam may be worked if desired. The skelp is then cleaned and formed into a tubular or slightly oval blank, preferably by a press-forming operation in which the blank-forming force is applied simultaneously and uniformly throughout the length of the blank. The blank is then transported to suitable sizing or working rolls which further align and render longitudinally uniform the seam edges and areas adjacent thereto and insure the proper blank size and shape. The sizing rolls, contrary to known practice, are not directly before the welding unit, but are such a distance from the welding unit that the blanks are completely through the sizing rolls prior to passing to the welding unit. This insures that the resistance to the passage of the blank through the sizing rolls will not affect the uniform positively controlled speed of the blank through the welding unit.

From the sizing rolls the blank passes to a feed mechanism for positively and uniformly moving the blank through the welding throat. Means for aligning the seam to be welded and for reforming the blank are associated with positive feed mechanism. The feed mechanism for positively and uniformly moving the blank through the welding throat includes a pair of carriages positioned in front of the welding unit with each of the carriages being adapted to automatically engage the end of every other blank with means for alternately moving the one carriage toward and the other away from the welding throat so that as one carriage moves a blank through the throat the other carriage positions itself to engage the next blank to be moved through the welding throat.

The welding unit includes a welding throat formed of blank-engaging rolls adapted to apply diameter reducing pressure to the blank over its entire circumference in its passage through the welding throat. The rolls include electrodes contacting with the blank on each side of the seam to be welded. The electric resistance method of welding is employed which, together with the diameter reducing pressure of the rolls, effects a true body weld.

Associated with the welding unit after the welding throat are a flash cutter, a planisher for smoothing the welded seam, and means for pulling the blank from the welding throat. These last-named means preferably comprise final sizing rolls which perform the dual function of sizing and pulling the pipe.

Figure 2:
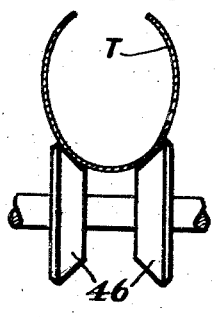
Figure 3:
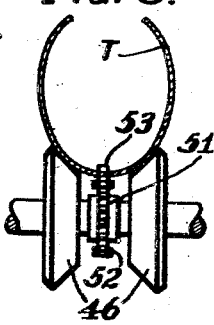
Figure 4:
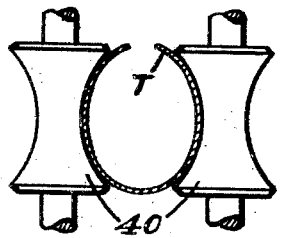
Figure 5:
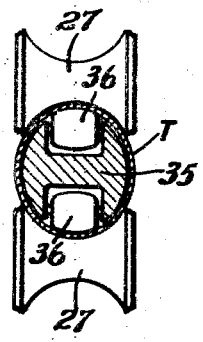
Figure 6:
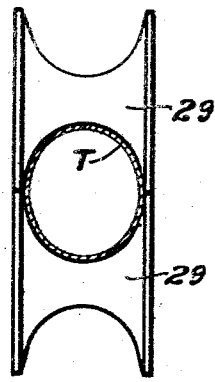
Figure 12:
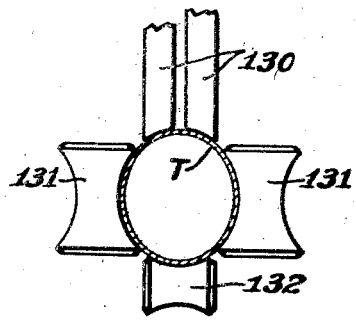
Figure 13:
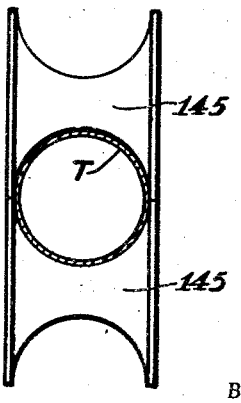

Apparatus which may be used in the practice of the invention as just explained is illustrated in the accompanying drawings, of which Figs. 1a, 1b, and 1c are a plan view of the entire apparatus with the different figures being joined together at the lines X—X and Y—Y; Fig. 2 is a diagrammatic cross-sectional view taken on line II—II of Fig. 1a and illustrating the rolls for carrying the tubular blanks; Fig. 3 is a diagrammatic cross-sectional view taken on line III—III of Fig. 1a and illustrates the means for feeding the blanks to the sizing rolls; Fig. 4 is a diagrammatic cross-sectional view taken on line IV—IV of Fig. 1b and illustrates a tubular blank in the vertical forming rolls; Fig. 5 is a diagrammatic cross-sectional view taken on line V—V of Fig. 1b and illustrates the arrangement of the horizontal forming rolls and the internal mandrel associated therewith; Fig. 6 is a diagrammatic cross-sectional view taken on line VI—VI of Fig. 1b and illustrates the horizontal sizing rolls; Fig. 7 is an enlarged plan view of the positive drive mechanism for moving the tubular blanks through the welding throat; Fig. 8 is a cross-sectional view taken on line VIII—VIII of Fig. 7; Fig. 9 is an enlarged cross-sectional view taken on line IX—IX of Fig. 1c and illustrates the aligning and supporting rolls for the tubular blanks at the positive drive mechanism; Fig. 10 is an enlarged cross-sectional view, taken on line X—X of Fig. 1c, of the restoring and aligning rolls directly before the welding unit; Fig. 11 is an enlarged longitudinal cross-sectional view of the welding unit; Fig. 12 is a cross-sectional view taken on line XII—XII of Fig. 11; and Fig. 13 is a diagrammatic cross-sectional view taken on line XIII—XIII of Fig. 1c and illustrates the final sizing rolls.

General assembly

Referring particularly to Figs. 1a, 1b, and 1c of the drawings, the embodiment of the invention illustrated comprises: a skelp-receiving table; an edge trimming and working station; a skelp cleaner; a means for conveying the skelp to a press former; the press former where the flat skelp is formed to a tubular blank; a conveyor for carrying the tubular blank to sizing and forming rolls; positive means for moving the blank into the sizing and forming rolls; the sizing and forming roll station where the tubular blank is very accurately formed to the desired size and where the surfaces adjacent the seam (later to be contacted by the electrodes) are properly contoured and uniformly made the same; the positive speed control means for moving blanks in turn through the welding unit; aligning and reforming rolls; the welding unit and the final withdrawing means and sizing rolls. The mechanism is adapted to continuously produce pipe or similarly welded articles by a commercially practical, relatively rapid method.

In that certain of the features of the general assembly are similar for all individual units or stations, they will now be described. The various roll conveyors and positive speed control means can be mounted upon any suitable type of base structure as, for example, by providing rails 10 which are adapted to have housings 11 secured thereto at any desired position or number. The housings 11 carry the rolls or other apparatus comprising each station and likewise serve to carry any of the auxiliary mechanisms associated with the same stations. In certain instances it may be desirable to interconnect the housings 11 by other means than the base rails, or the rails may be interrupted to make room for individual mechanisms such as the press former or the welding unit. This construction permits ready addition to or elimination of housings or individual roll stands or other apparatus, as well as respacing thereof which is desirable so that my apparatus can readily be adapted to handle pipe of different size and character.

The various specific mechanisms forming the apparatus will now be discussed in detail.

Skelp receiving, edge trimmer and worker, cleaner, and conveyor

The invention contemplates taking flat skelp and trimming the edges thereof to the proper width so that when the skelp is formed to a tubular blank the blank will be of the proper shape and diameter. Likewise the trimmed edges of the skelp can be worked while the skelp is still in flat form to provide any desired type of edge on the flat skelp which will best adapt itself to be welded as hereafter discussed. The mechanism for performing these operations may be of any known type such as illustrated in Fig. 1a of the drawings. A skelp-receiving table 15 is positioned in advance of an edge trimmer and worker 16 having any known type of edge-trimming and working means such as indicated by the numeral 17. The skelp is laid on the receiving table 15 and is fed by power or other means to the edge trimmer and worker 17 from where it passes to and through a cleaner 18 of any desired type, such as a centrifugal sand blast mechanism, and on to a conveyor 19, preferably power-driven, which is adapted to carry the skelp to the press former.

Press former

In Fig. 1a of the drawings the numeral 20 indicates generally a press-forming apparatus which is adapted to apply pressure simultaneously to every portion of the length of the flat skelp to form the same, in a series of one or more pressing operations, into a tubular blank. The blank is preferably formed slightly elliptical in cross-section as seen in Fig. 2 of the drawings. Apparatus for press forming is quite well known and will not be discussed in detail. The former should, however, be of a type adapted to press the skelp into a tubular blank free of buckled, warped, or uneven portions, particularly adjacent the seams to be welded. Press forming is believed to improve the uniform characteristics of the blank which will assist in obtaining a better weld and which will avoid uneven or changing contact and resistance between the welding electrodes and the edges of the pipe seam, and which will likewise improve passing the blank at an even uniform speed through the welding throat.

Means are preferably associated with the press former for positively ejecting the formed blank therefrom so that the operation of the press can be carried on in a substantially continuous manner.

Roll sizing and forming station and conveyors for feeding the tubular blank thereto In the form of the apparatus illustrated in the drawings, mechanism is provided for sizing and forming the tubular blank after it has been press formed. These means still further improve the even concentric character of the blank and eliminate any possible ripples, warping, etc., therein, and likewise function to exactly size the tubular blank prior to but at a distance from the welding operation.

Referring now to Figs. 1a and 1b of the drawings, the numeral 25 indicates generally a sizing and forming station having a plurality of pairs of rolls 26, 27, 28, and 29 mounted on horizontal shafts and journalled in suitable housings 11 secured to the rails 10. The rolls 26 to 29 are positively driven, with the exception of bottom roll 27, through suitable mechanism including gear boxes 30 and individual motors 31.

As illustrated in Fig. 5, the rolls 26 to 29 extend a substantial distance about the tubular blank which has been indicated by the letter T. In order to further improve the longitudinally even characteristics of the blank, particularly adjacent the seam and where the electrodes are to contact, a mandrel 35 is mounted at one end on the housing carrying the rolls 40, and internal rolls 36 are journalled on the mandrel adjacent the rolls 27 so as to engage with the inner surface of the blank. Thus the seam edges of the blank, as well as the entire blank, are still further trued up to an even uniform contour and requisite dimensions.

The actual sizing rolls include rolls 28 which are preferably provided with a fin 38 which is adapted to engage in the open seam of the tubular blank and which functions to properly align the blank in the rolls and to control the seam edges in accordance with known practice.

Fig. 6 illustrates diagrammatically the sizing rolls 29 which like the rolls 28 have full circumferential engagement with the blank T.

Positioned at the front of the sizing station is a pair of vertically journalled rolls 40 which are carried in a suitable housing 11 secured to the rails 10. These rolls 40 receive the tubular blank and function to form it to elliptical shape as shown diagrammatically in Fig. 4.

Associated with the sizing and forming roll station are conveyors which receive the tubular blank from the press former and convey the same to and into the sizing rolls. The conveyor for receiving the tubular blank from the press former is indicated generally by the numeral 45, and it includes a plurality of rolls 46 which are journalled in suitable housings 11 secured to the rails 10. The rolls 46 are preferably driven, and as illustrated in Fig. 1a of the drawings every other roll is provided with an individual motor 47 which serves this purpose. Fig. 2, illustrates diagrammatically the rolls 46 which receive and carry the tubular blank T thereon.

Inasmuch as the passage of the tubular blank through the sizing and forming roll station necessitates some means for starting the blank therethrough, positive conveying mechanism is provided for this purpose. This positive conveying mechanism may take the form of that identified generally by the numeral 50 in Figs. 1a and 1b of the drawings, which comprises a continuation of the conveyor 45 except that a chain drive is incorporated therewith. To this end sprockets 51 are secured on the shafts carrying the rolls 46 and these sprockets carry and drive chain 52 having dogs 53 secured thereto at spaced intervals which, as seen in Fig. 3, are adapted to engage behind the end of a pipe blank to force the blank into the forming and sizing station as the chain is driven. An individual motor 54 operating through a gear box 55 and connected to the end roll 46 is provided to obtain positive drive for the chain feed mechanism.

*Positive speed control means*

The invention particularly contemplates and provides mechanism for feeding the blanks through the welding unit at very positive constant speed. This mechanism may take a plurality of forms but must be adapted, under commercial production requirements, to continuously engage spaced tubular blanks fed to it, and to then carry these blanks in turn to and through the welding throat in such a manner that any unevenness in the speed of the blank through the welding throat is entirely avoided.

Mechanism which achieves this desired object is illustrated generally in Figs. 1b and 1c of the drawings, and is indicated by the numeral 60. The frame or bed of the positive speed control means comprises the rails 10 having housings 11 secured thereto with a plurality of rolls 61 and 64 being journalled in the housings, as best seen in Fig. 9. Motors 62 are provided to drive at least alternate rolls 61. The rolls 61 and 64 receive the tubular blank from the sizing and forming station and function to move the blank toward the welding unit at a reasonably even speed due to their frictional engagement with the outer surface of the blank. The rolls 61 are preferably provided with fins 63 which engage in the seam of the blank and which serve as positive aligning and centering means.

Fig. 9 illustrates in cross section the rolls 61 and 64 associated with the positive speed control means. To facilitate the arrangement of the carriage feed mechanism, the rolls 64 are narrow and journalled at spaced circumferential distances around the housing to support the tubular blank from the sides and angularly from below. These rolls are carried in any suitable bearing structures, such as those illustrated in Fig. 9, and means, such as adjusting screws 100, can be provided for adjusting the rolls 64 toward and from the axis of the tubular blank T. The rolls 61 are mounted in bearing structures 101 which are positioned by adjusting screws 102 operated by shaft 103 in accordance with usual and well-known practices.

Associated with the frictional feeding and aligning rolls 61 and 64 are positive drive mechanisms which comprise a pair of carriages 65 and 66 which are slidably mounted in the housings carrying the rolls, and which are adapted to be alternately moved toward and away from the welding unit with each carriage engaging alternate tubular blanks.

Referring to Figs. 7, 8, and 9, which illustrate the details of the carriage structure, the numeral 67 indicates a shaft which rotatably supports a plurality of wheels or rollers 68 which slidably carry the carriages 65 and 66. Flanges 69 are provided on the rollers 68 and prevent lateral displacement of the carriages 65 and 66.

In order to effect reciprocating movement of the carriages any suitable positive mechanism can be provided and in the embodiment of the invention illustrated this mechanism takes the form of a rack and helical gear drive. Numeral 70 indicates racks which are secured to the bottom of the carriages 65 and 66 between the rollers 68 supporting the same, and the numerals 71 indicate the helical gears engaging with the rack with the gears being mounted upon shafts 72 which are driven in opposite directions by a motor 73 through gear box 74. Thus, as one carriage is being moved toward the welding unit the other is being moved away from the welding throat.

Inasmuch as the reciprocating movements of the carriages are continuous, a limit switch 75 is adjustably mounted on one of the housings 11 adjacent the helical gears 71 and this limit switch is adapted to be engaged by a finger 76 secured to the end of the carriage with the limit switch 75 when actuated reversing the direction of rotation of the motor 73. A limit switch 77 is secured to the opposite side of the housing and is adapted to be engaged by a finger 76 on the other carriage so that the motor will be reversed at the end of the forward feeding cycle of each carriage.

The carriages 65 and 66 are adapted to automatically pick up or engage with the end of the tubular blanks fed towards the welding throat and means on each carriage for achieving this result, in the embodiment of the invention illustrated, include a bracket 80 secured by a tapered pin 81 to the inner forward end of the carriage. A dog 84 is carried on the forward end of the bracket 80 and is mounted for controlled vertical and lateral movement. This is obtained by forging a trunnion 85 integral with the dog 84 which is received in suitable bearings in the bracket 80. The dog is normally urged and held upwardly by a spring-urged pin 86 with shoulders 87 and 88 on the dog and bracket respectively limiting this movement and effecting positive force transfer between the carriage and the dog without bending movement during the blank feeding operation.

The trunnion 85 is extended laterally of the dog 84 and is engaged by a leaf spring 90 secured to the bracket 80 which functions to hold the dog resiliently toward the inside of the carriage and in alignment with the line of passage of the blanks. The spring pin 86 resiliently holds the dog in a vertical position in alignment with the end of the pipe blank. A notch 95 is formed on the end of the dog and is adapted to engage the end of the blank during forward movement of the carriage.

Upon return movement of the carriage the spring pin 86 and the leaf spring 90 permit the dog of the returning carriage to spring past the pipe blank and the dog of the forwardly moving carriage. The dogs are preferably formed with tapered portions 96 and 97 which facilitate this operation.

In the operation of the positive speed control means as the carriages alternately move toward and away from the welding throat they will pick up the tubular blanks in turn and move them at a very positive, uniform speed through the welding throat. It should be understood that the speed of movement of the carriages 65 and 66 is slightly greater than the speed of the frictional drive provided by the rolls 61 so as to prevent any chance that the frictional drive means might carry the blank ahead of the positive drive means during the welding operation. In this regard it should be recognized that the positive drive mechanism of the present invention can be employed without frictional driving means being associated therewith, although this is not preferred.

In commercial practice, the movement of the carriages 65 and 66 is preferably synchronized with the blanks fed thereto through the provision of an operator who controls the starting and stopping of the motor 73. An operator is needed at the welding unit to observe the movement of the blank through the welding throat, the contact of the electrodes on the blank, the character of the weld, etc., and push-button controls for the motor 73 are provided at this operator's station.

Thus assuming the carriages 65 and 66 are stopped with one carriage fully advanced and the other fully retracted, the operator will watch the next blank fed to the welding unit by the friction drive rolls 61 and will start the motor 73 and pick up the blank with the retracted carriage at the proper time. Once the blank has been fed through the welder the motor 73 can be stopped to wait for the next blank, or if the blanks are being fed in even, spaced relation, the carriages can be left continuously reciprocating as above explained.

In order to adapt the apparatus to take care of different lengths of blanks to be welded, couplings 79 are preferably provided in the shafts 72 driving the carriages 65 and 66. These couplings can be broken and remade after moving the carriages so that they will have less travel. It will be necessary to reset the limit switches 75 and 77 when this is done unless the fingers 76 are put adjacent the back end of the carriages originally, which the invention likewise contemplates.

*Aligning and reforming rolls*

An important feature of the invention is that the sizing and forming rolls associated with the apparatus are positioned at such a distance from the welding unit that the varying forces encountered during sizing do not affect the speed of the tubular blank through the welding unit. However, because the formed tubular blank will naturally tend to spring back after its sizing and forming to a certain degree, I have found it advisable to incorporate aligning and restoring rolls adjacent the welding unit which are preferably not driven.

As seen in Figs. 1c and 10, the aligning and reforming rolls include a housing 110 which is mounted upon the casting 111 forming the bed of the welding unit. The housing 110 carries a framework 112 which can be adjusted vertically on the housing through the provision of cam and screw mechanism 113 of known design. The frame 112 journals the aligning and reforming rolls which include horizontally positioned rolls 115 either or both having an aligning fin 116 formed thereon. Each roll 115 is adapted to extend over a considerable portion of the tube, and in the embodiment of the invention illustrated the contact between the roll and the tube is approximately 120°. Suitable means are provided for the adjustment of the roll 115 and in the form of the invention shown these comprise screws 125 supporting the bearings for the roll, with worm and worm gear mechanism 126 of known type being used to control the position of the screws.

Associated with each roll 115 is a pair of rolls 119 which are positioned at each side of the frame 112 and which are journalled in suitable bearing structure of any standard design that permits adjustment of the rolls toward and from the axis of the tubular blank T. The bearing structure is indicated generally by the numeral 120 and the adjusting screws by the numeral 121. The rolls 119 extend around the tubular blank as far as possible without interfering with the carriage structure and so that they can be adapted to provide the necessary restoring of the blank.

*The welding unit*

The welding unit may be of any standard electric resistance type and in which a full support for the tubular blank is provided at the welding throat with the blank being reduced in diameter at the welding throat through the application of relatively-heavy, fully-circular pressure on the blank. The welding unit seen in Figs. 1c and 11 of the drawings comprises the casting 111 which adjustably journals, through mechanism of known type, the rolls forming the welding throat. These include the electrodes 130, the vertically journalled side rolls 131 and the bottom roll 132. The arrangement of the rolls at the welding throat is diagrammatically illustrated in Fig. 12 of the drawings.

Associated with the rolls forming the welding throat are side rolls 133 and 134 which are likewise adjustably mounted on suitable bearing structure and which respectively receive the tubular blank before and after the welding operation. The rolls 133 press the sides of the blank together prior to the welding throat and insure that the faces of the seam to be welded meet a constant distance in advance of the vertical center of the electrodes. They likewise insure that the meeting angle of the seam faces remains constant and as received from the restoring rolls which have the fins holding the seam a constant distance apart. To further assist in maintaining the meeting angle of the seam faces constant, I believe it novel to employ an auxiliary roll 135 which fits in the seam of the blank between the side rolls 133 and the restoring rolls.

Other features of the welding unit include the provision of an electrode-trimming means 136, a flash cutter 137 and a planishing wheel 138 having an internal mandrel 139 and pressure rolls 140.

Inasmuch as the tubular blank is given full support over substantially its entire circumference at the welding throat, it is impossible to push the tubular blank completely through the welding throat by the carriages. These necessarily must stop short of the throat as illustrated in Fig. 11. The final sizing rolls which are associated with the apparatus preferably perform the function of drawing the last few inches of the tubular blank through the welding throat as hereafter explained.

The rolls forming the welding throat are adapted to exert a relatively heavy pressure on the tubular blank during the welding operation, and they effect a noticeable upsetting of the welded seam while insuring the positive mating of the surfaces to be welded, and positive contact between the welding electrodes and the seam edges. These factors together with constant uniform movement of the blank through the welding throat effect a very positive and uniform body weld of pipe seam.

*Withdrawing and final sizing rolls*

As referred to above in conjunction with the description of the welding unit, the apparatus is provided with final sizing rolls which preferably function likewise to withdraw the tubular blank from the welding unit when a carriage has pushed the blank substantially through the throat but can move no farther. These final sizing and withdrawing rolls are illustrated in Figs. 1c and 13 of the drawings and comprise a plurality of pairs of rolls 145 which are journalled in suitable housings mounted upon the rails 10. The rolls 145 each engage substantially a full 180° of the tubular blank and effect a final sizing thereof after the planishing operation. The rolls are driven by individual motors 146, the motors being provided on alternate roll stands. Means other than the sizing rolls may be employed to withdraw the final inches of the blank through the welding throat. For example, a tong pick-up or a friction drive could be used.

*Summary*

It is believed that the operation of the apparatus will be understood from the foregoing detailed description of the apparatus and operation of individual stations and mechanisms. Suffice it to say that the skelp is received in flat form and is edge-trimmed and edge-worked and is then passed to the press former which presses the same into tubular blank shape from which it is conveyed through the sizing and forming rolls which further improve the uniform character of the blank and particularly the areas adjacent seam edges to be welded. The positive speed control means for carrying the blanks in turn through the welding unit now pick up the blanks, and after pushing them through the aligning and restoring rolls carry the blanks through the welding throat at a constant even rate of speed with a considerable pressure being exerted at the welding throat. From the welding unit the pipe passes to the final sizing rolls which function to draw the last several inches of each tubular blank through the welding throat.

While they have not been stressed heretofore, other particular features of the invention which are noteworthy include the following: The sizing and forming rolls are positioned such a distance from the welding unit that no tubular blank is simultaneously being sized and welded; a double forming and sizing operation is performed on the tubular blank, namely, press forming followed by a roll sizing, so that the tubular blank is very uniform without warped or uneven surfaces; and means for very positively controlling the angle and extent of meeting of the seam faces prior to the center line of the welding throat. The method and mechanism comprising the invention are adapted to the commercial manufacture of welded seam casing, pipe or like articles in that the apparatus is rapid, continuous and efficient, and necessitates no expensive controls, labor or up-keep costs.

The words "positive" and "positively" employed in the claims are intended to limit the combinations claimed to the use of other than frictional or friction means.

While in accordance with the patent statutes one embodiment of the invention has been illustrated and described in detail, it should be understood that the invention is not limited thereto or thereby but is defined in the appended claims.

I claim:

1. In an apparatus for the electric resistance welding of the adjacent seam edges of tubular blanks, the combination of a welding throat comprising blank-engaging pressure rolls and rotary electrodes formed to bear upon a blank throughout its circumference and positioned to form a pass of substantially less diameter than the blank to be welded, a rigidly-acting blank feeder movable in the line of feed through said throat, means on the blank feeder for positively engaging a blank, and means for moving said feeder at a uniform speed to cause the blank to pass through said throat and to be reduced in diameter thereby and to have its meeting edge portions uniformly welded throughout and substantially from end to end of the blank.

2. In an apparatus for the electric resistance welding of the adjacent seam edges of tubular blanks, the combination of a welding throat comprising blank-engaging pressure rolls and rotary electrodes formed to bear upon a blank throughout its circumference and positioned to form a pass of substantially less diameter than the blank to be welded, a rigidly-acting blank feeder movable in the line of feed through said throat, means on the blank feeder for positively engaging a blank, a motor, and rigidly-acting driving connections between the motor and the blank feeder for moving said feeder at a uniform speed to cause the blank to pass through said throat and to be reduced in diameter thereby and to have its meeting edge portions uniformly welded throughout and substantially from end to end of the blank.

3. In combination, an electric resistance welding throat, means for positively engaging and pushing a ferrous blank to be welded partly through the throat, and frictional means for pulling the blank the remaining distance through the throat.

4. Pipe-welding apparatus including an electric resistance welding throat, means for bringing the pipes as separate blanks in turn to the throat, and a plurality of reciprocating means functioning in turn to automatically engage the next blank and force it through the welding throat at a definite constant speed.

5. In combination, in apparatus for feeding a pipe to a welding throat, a pair of carriages adapted for movement to and from the welding throat, means for driving the carriages in opposite directions, automatic means for changing the direction of the driving means at the end of each feeding cycle, and means associated with each carriage for automatically and positively engaging a pipe at the beginning of movement of the carriage toward the welding throat.

6. In combination, means for electric welding seams in pipe blanks or the like, frictional contacting means for conveying the blanks to the welding means, and positive means independent of the frictional contacting means for moving the blank through the welding means at an unvaried rate of speed.

7. Apparatus for electric welding longitudinal seams in pipe blanks including means forming a welding throat, means adapted to positively engage with the end of the pipe blank, and other means adapted to frictionally engage with the sides of the pipe blank, means for operating said positive and frictional engaging means to move the pipe blank entirely through the welding throat, the blank-moving speed of the positive means being slightly greater than the blank-moving speed of the frictional means.

8. In combination, means for welding by electric resistance a seam on a pipe blank or the like, means for conveying blanks in turn to the welding means, and a plurality of positively actuated mechanisms, each of said plurality of mechanisms being adapted to engage with alternate blanks to accurately control movement of the same substantially past the welding means.

9. Electric resistance tube-welding apparatus including a welding throat, conveying means for bringing the tubes in the form of separate blanks to the throat, a pair of carriages associated with the conveying means, each of the carriages being adapted to automatically engage the end of every other blank, and means for alternately moving one carriage toward and the other away from the welding throat so that as one carriage moves a blank through the throat the other carriage positions itself to engage and move the next blank through the throat.

10. Apparatus for body welding a longitudinal butt seam on relatively heavy-walled, large-diameter preformed pipe blanks, which comprises rolling means forming a welding throat and adapted to apply full circle diameter-reducing pressure to a blank, said rolling means including electrodes contacting with the blank on each side of the seam, and other means positively engaging the blank and pushing it through the welding throat at a constant speed, said last-named means including a rack adapted to engage with the blank and a motor-driven helical gear for controlling the position of the rack.

11. Apparatus for welding a longitudinal butt seam on blanks, which comprises rolls forming a welding throat, said rolls including electrodes contacting with the blank on each side of the seam, and means for positively moving the blank through the welding throat at a constant speed, said last-named means including a rack adapted to engage behind and push the blank and a motor-driven helical gear for controlling the position of the rack.

12. In an apparatus for the electric resistance welding of the adjacent seam edges of tubular blanks, the combination of a welding throat comprising blank-engaging pressure rolls and rotary electrodes formed to bear upon a blank throughout its circumference and positioned to form a pass of substantially less diameter than the blank to be welded, a rigidly-acting blank feeder movable in the line of feed through said throat, means on the blank feeder for positively engaging a blank, a motor, and rack and pinion driving connections between the motor and the blank feeder for moving said feeder at a uniform speed to cause the blank to pass through said throat and to be reduced in diameter thereby and to have its meeting edge portions uniformly welded throughout and substantially from end to end of the blank.

HERMAN G. BLEVINS.